United States Patent

[11] 3,613,541

| [72] | Inventor | David E. Beach<br>Penfield, N.Y. |
|---|---|---|
| [21] | Appl. No. | 26,015 |
| [22] | Filed | Apr. 6, 1970 |
| [45] | Patented | Oct. 19, 1971 |
| [73] | Assignee | Eastman Kodak Company<br>Rochester, N.Y. |

[54] GEAR DRIVE FOR A CAMERA AND FILM CARTRIDGE
3 Claims, 4 Drawing Figs.

[52] U.S. Cl. ..................................... 95/31 R,
95/31 CA
[51] Int. Cl. ..................................... G03b 19/04
[50] Field of Search ..................................... 95/31 R, 31 CA

[56] References Cited
UNITED STATES PATENTS
3,011,419  12/1961  Takahama .................... 95/31 R Primary Examiner—Samuel S. Matthews
Assistant Examiner—Michael L. Gellner
Attorneys—Robert W. Hampton and D. Peter Hochberg

ABSTRACT: A film cartridge housing encloses a core which is rotatably mounted therein. The housing extends over a gear carried by the spool and defines an opening through which a camera driving gear is insertable for engaging the spool gear and rotating the spool. In a preferred embodiment, the gear axes define a plane which is offset from a normal to the film plane by an angle equal to the pressure angle of the gears, thereby creating a line of force parallel to the film plane. By arranging for such line of force to pass through a cartridge-supporting surface in the camera at a position where the film cartridge contacts the surface, any tendency of the cartridge to be unseated from the supporting surface in response to the creation of a force component normal to the film plane is negated.

DAVID E. BEACH
INVENTOR.

BY

ATTORNEYS

DAVID E. BEACH
INVENTOR.

BY D. Peter Hochberg

Robert W. Hampton

ATTORNEYS

GEAR DRIVE FOR A CAMERA AND FILM CARTRIDGE

CROSS-REFERENCES TO RELATED APPLICATIONS

Reference is made to commonly assigned copending U.S. Pat. application Ser. Nos. 26,014 and 25,957, each entitled "Gear Drive for a Camera and Film Cartridge," filed on even date herewith in the names of Richard J. Bresson and James E. Dierks, and Evan A. Edwards, respectively.

BACKGROUND OF THE INVENTION

1. Field of the Invention

The present invention relates generally to film cartridges and the means for transporting film loaded therein. More particularly, the invention relates to a gear-driven film cartridge for effecting the transportation of film loaded in the cartridge, and to a camera for receiving such a cartridge.

2. Description of the Prior Art

The film cartridges currently in wide use comprise film supply and takeup chambers connected by a wall member, and are receivable in cameras as a unitary package. Film is transported to the takeup compartment of many cartridges by rotating a core in the takeup compartment to wind film thereon. In many of these cartridges, the core is rotated by a camera drive member which is in axial alignment with the core and which is in endwise engagement therewith. As a result, the camera must be high enough to accommodate the drive member, thus rendering it relatively cumbersome. Moreover, a mechanism must usually be provided to withdraw the camera drive member from the insertion and removal path of the cartridge to permit loading and unloading of the camera.

U.S. Pat. No. 3,296,949, issued Jan. 10, 1967 to W. E. Bounds, discloses a camera and a film magazine having a gear-driven takeup spool wherein a camera drive gear and the spool gear are in adjacent coplanar relationship when engaged, with the axes of the driven gear of the magazine and of the driving gear of the camera lying in a plane which is offset from a normal to the film plane. However, the orientation of the driven and driving gears of the magazine-loaded camera is such that, upon engagement of the gears, a rearwardly directed force is created which tends to unseat the magazine and move the film from the focal plane of the camera. There is no suggestion that any countervailing reasons exist for the selection of the chosen angle of offset from the driving and driven gears. In addition, aside from an opening in the magazine casing providing access to the magazine gear, there is an absence of any means for facilitating the initial engagement of the camera gear with the magazine gear, thus making precise alignment of the gear necessary to effect their engagement. Furthermore, the magazine gear periphery is located close enough to the access opening so that inadvertent manual rotation thereof, with resultant undesired film advance, is possible. The diameter of the magazine gear is about the same as the inner diameter of the takeup chamber in which the gear is located, and the magazine casing is large enough to contain the gear.

Commonly assigned U.S. Pat. No. 2,172,337, issued Sept. 5, 1939 to J. Mihalyi, discloses a roll film camera with a gear-driven cartridge. The cartridge gear is not enclosed in the cartridge housing, but is partially exposed therefrom. The driving and driven gears are offset angularly from the normal to the film plane, but the criteria for selection of the offset is not suggested. Again, by virtue of the direction of such offset, a force is created in response to pressure between the gears tending to displace the film cartridge rearwardly in the camera, necessitating the employment of sufficiently sturdy camera elements to counterbalance the unseating force.

SUMMARY OF THE INVENTION

An object of the present invention is the provision of a film-advancing apparatus in a gear-driven, cartridge-loaded camera wherein the gears and cartridge seating elements are so arranged that the tendency of the cartridge to become unseated upon engagement of the driving and driven gears is minimized.

In accordance with a preferred embodiment of the present invention, the housing of a gear-driven film cartridge encloses a rotatable core having a gear at one end. The cartridge gear is engageable by a camera driving gear for effecting the rotation of the core. When the cartridge is received in the camera, a plane defined by the axes of the driving and driven gears is offset from the normal to the film plane in such a manner as to minimize the tendency of the force created by pressure between the gears to unseat the film cartridge from a support surface in the camera.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DETAILED DESCRIPTION OF THE INVENTION

Because cameras and film cartridges are well known, the present description will be directed in particular to camera and cartridge elements forming part of, or cooperating more directly with, apparatus in accordance with the present invention. It is to be understood that camera and cartridge elements not specifically shown or described may take various forms well known to those skilled in the art.

Figure 1:
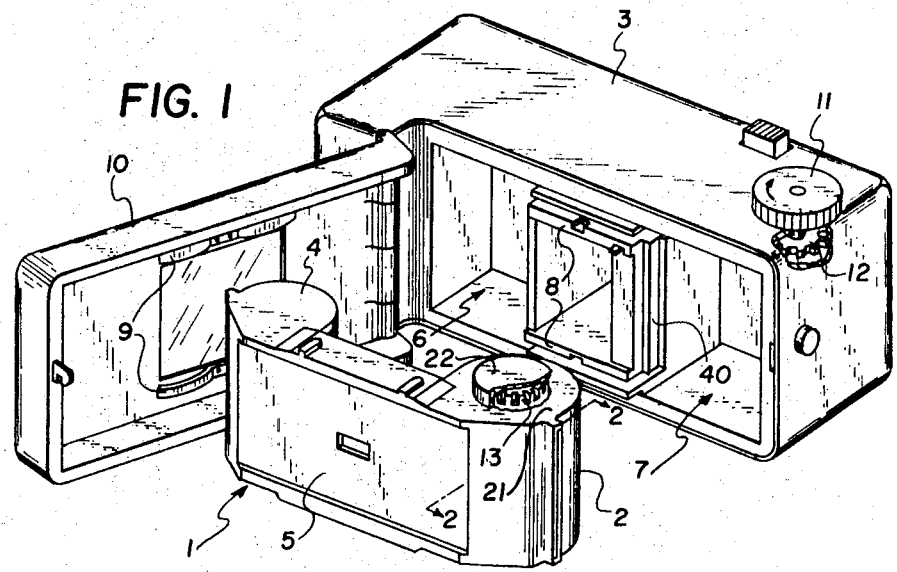
FIG. 1 is a perspective view of a film cartridge and camera according to the invention.

A film cartridge 1 is shown in FIG. 1 in position for insertion into a camera 3 and comprises a film supply compartment 4, a wall 5 defining a film plane on the forward face thereof, and a film takeup compartment 2. Camera 3 includes chambers 6 and 7 for receiving the supply and takeup compartments respectively, of film cartridge 1. Film cartridge 1 is accurately located with respect to the focal plane of the camera objective (not shown) by means of horizontal support members 8, and vertical stepped support members 40, which members engage corresponding structure 41 in cartridge 1 (see FIG. 3). A received cartridge is urged into engagement with members 8 and 40 by leaf springs 9 mounted on the interior of camera door 10, which is hinged to the rearward part of camera 3 in a conventional manner. The camera film advance mechanism comprises a manually operable knob 11 to which is attached a driving gear 12, gear 12 being engageable with a gear 13 connected to a core in takeup chamber 2, in a manner and for reasons to be described hereinafter.

Figure 2:
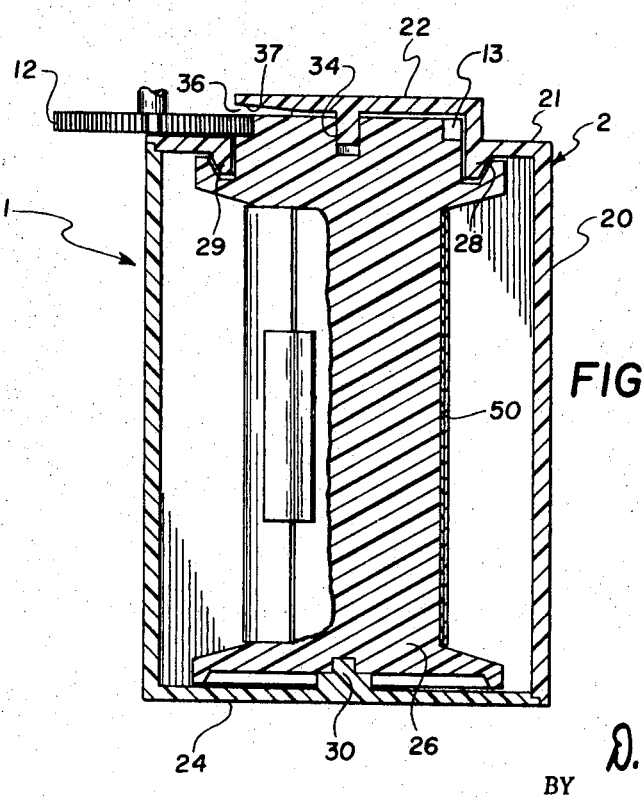
FIG. 2 is a section through line 2—2 in FIG. 1 as it would appear when the cartridge is loaded in the camera, with a camera drive gear shown in engagement with a cartridge gear.

The section through the line 2—2 of FIG. 1, illustrated in FIG. 2, indicates that takeup chamber 2 comprises a generally cylindrical casing 20, a top wall 21 including a gear cover 22, and a bottom wall 24. Enclosed in takeup chamber 2 is a film core 26 having an annular recess at its upper end in a mating relationship with an inwardly extending annular lip 28 to form a labyrinth light seal at the upper end of chamber 2, and another recess at its lower end by means of which core 26 is journaled on post 30. Integral with the film spool 26 is gear 13 which, when rotated, drives core 26 to wind film 50 from supply chamber 4 onto core 26. Gear cover 22 extends over gear 13 to an extent sufficient to render gear 13 manually inaccessible, and has extending therefrom a post 34 which serves as a bearing for gear 13. The diameter of gear 13 is substantially less than the diameter of takeup chamber 2, and gear cover 22 is only large enough to fulfill its function, thereby maintaining the compactness of the cartridge. Top wall 21 and gear cover 22 define an opening 36 through which driving gear 12 in camera 3 is given access to gear 13 for engagement therewith. The end portion 37 of gear cover 22 is tapered to guide driving gear 12 through opening 36 and into engagement with gear 13. Preferably, compartment 7 of camera 3 is so structured that, upon insertion of film cartridge 2 into camera 3, gears 12 and 13 necessarily become engaged.

For purposes of economy of manufacture, the housing shown consists of only two sections. One section includes part of sidewall 20, top wall 21, gear cover 22, guidemember 28 and bearing post 34, and the other section includes the remaining part of sidewall 20, post 30, and bottom wall 24. These components are preferably made from molded plastic, but other suitable materials and methods will readily occur to those skilled in the art.

Figure 3:
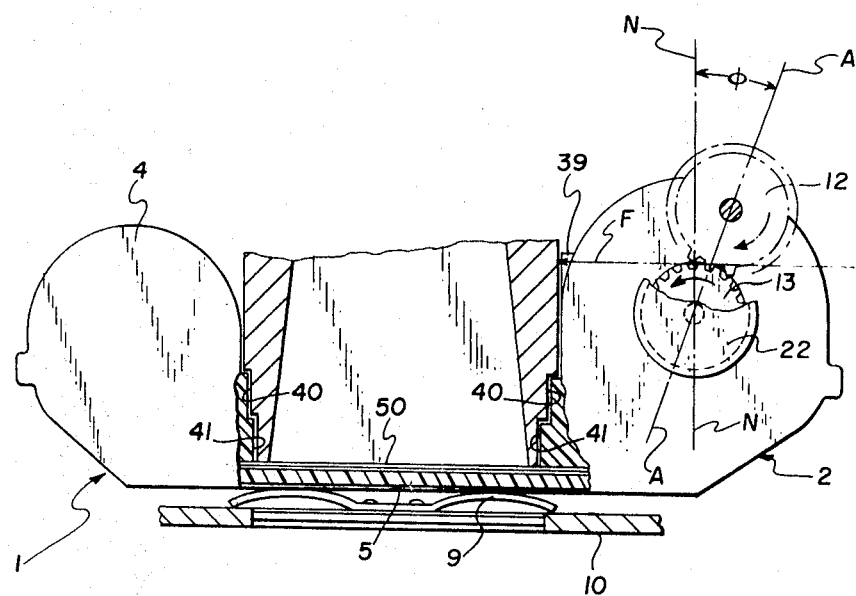
FIG. 3 is a schematic illustration of a top view of a film cartridge loaded in a camera, with portions cut away to expose the gear train.

Referring now to FIG. 3, film cartridge 2 is shown loaded in camera 3 and positioned on support members 40 of the camera. Leaf springs 9 fastened to camera door 10 urge cartridge 2 against camera support members 40. Gear cover 22 of takeup chamber 2 is cutaway in FIG. 3 in order to reveal core gear 13 and camera driving gear 12. As indicated by the directional arrow on core gear 13, that gear must be rotated in a counterclockwise direction to wind film on core 26. Accordingly, knob 11 (FIG. 1) must be rotated in a clockwise direction to similarly rotate drive gear 12 to effect the proper displacement of gear 22. In the illustrated embodiment 12 and 13 have a pressure angle of 20°, but of course other gear angles could be used. By rotating or offsetting the plane A—A defined by the axes of rotation of driving gear 12 and core gear 13 from a normal N—N to the film plane by 20°, so that the angle of offset Φ equals the pressure angle of the gears, the directional force F resulting from the driving engagement of gears 22 and 20 is parallel to the film plane. The absence of a resulting force normal to the film plane negates the necessity of providing means for offsetting such a force in order to prevent the unseating of the film cartridge from support members 40. Film cartridge 2 is contoured by the provision of seating pad 39 on the outer surface of cylindrical casing 20, so that the cartridge contacts one support member 40 in the path of the line of force F, thus obviating the creation of a moment by the force F, and accordingly obviating the need for providing a counterbalancing moment to avoid unseating of film cartridge 2 by such a moment. Of course, if the line of force F passes near the point of contact, a slight moment will be created, which if minimal, is easily counterbalanced by springs 9.

Figure 4:
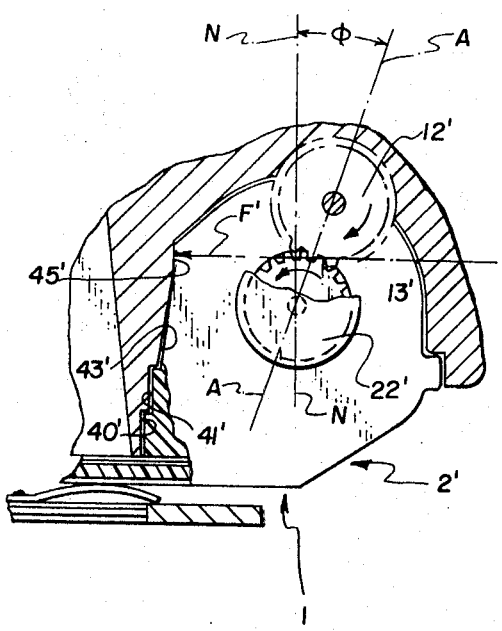
FIG. 4 is a partial top view of a film cartridge loaded in a camera according to an embodiment of the invention.

As an alternative to the contouring of film cartridge 2 to engage the camera along the line of force F as described above, the camera elements defining the chamber for a cartridge takeup compartment can be structured to accomplish the same end. Thus, referring to FIG. 4, a film cartridge 1' includes a takeup compartment 2' having a slightly modified profile from previously described cartridge 1. Takeup compartment 2' has therewith a gear 13', a gear cover 22', and support structure 41', which elements correspond in function and structure to the like-numbered elements (without the superscript) previously discussed. The camera in which cartridge 1' is loaded includes a gear 12' which engages gear 13' in such a manner, again referring to the earlier discussion, that the directional force F' is parallel with the film plane. To avoid a moment tending to unseat cartridge 1' from the camera support members, the camera support structure is contoured so that it engages the cartridge on the line of force F'. Hence, camera support members 40' include a slightly tapered portion 43' which need not be in contact with the cartridge, and a section 45' of no taper which is in intimate contact with the similarly shaped housing of cartridge 1' on the line of force F'. This section is sufficiently large to assure the line of force F' will pass through it regardless of slight variation in the manner of engagement of gears 12' and 13'.

It can be seen that each of the objects of the invention has been accomplished. A gear-driven film cartridge including gears selected and located as explained above, has been provided wherein the forces and moments resulting from the engagement of the gears are minimized, so that the mechanism for holding the film cartridge in place in the camera can be lighter, and more compact. Operation of the invention is simple, requiring the mere insertion of the cartridge into the camera and actuation of the camera drive mechanism.

The invention has been described in detail with particular reference to a preferred embodiment thereof, but it will be understood that variations and modifications can be effected within the spirit and scope of the invention.

I claim:

1. Photographic device comprising:
    a film cartridge;
    a camera adapted to receive said cartridge and having a focal plane;
    a film takeup core in said cartridge;
    a first gear on said cartridge and drivingly connected to said core;
    a second gear mounted in said camera for engagement with said first gear of a received cartridge to drive said first gear and to thereby define a pressure angle therewith, the axes of said first and second gears defining a plane which is offset from a normal to the focal plane by an angle substantially equal to the pressure angle of said gears such that the line of force created in response to driving engagement of said first and second gears is substantially parallel to the focal plane; and
    a support in said camera for contacting said cartridge at a position along the line of force to oppose movement of said cartridge by said force.

2. For use with a camera having a gear drive mechanism for advancing film loaded in the camera, the gear drive mechanism including a gear having an axis of rotation; a film cartridge comprising:
    means for supporting film in a plane for exposure;
    a film takeup chamber;
    a core rotatably mounted in said takeup chamber;
    a gear mounted on said core for rotation about an axis, said core gear being drivingly engageable by the camera gear when said cartridge is received in the camera to define a pressure angle, said gears being so oriented when engaged that their axes of rotation define a plane rotated from a normal to the film plane by an angle substantially equal to said pressure angle; and
    an abutment engageable by the camera at a position in a plane including the place of engagement of the camera gear and said core gear and parallel with the film plane.

3. For use with a film cartridge having means for supporting film in a plane for exposure, a film takeup compartment, a core rotatably mounted in the takeup compartment, and a gear mounted on the core and having an axis of rotation, a camera comprising:
    means for receiving the film cartridge;
    a gear oriented in said camera for engaging the gear of a received cartridge to drive the cartridge gear and thereby (1) to define a pressure angle and (2) to rotate the cartridge core to effect the advancement of film into the takeup compartment, said camera gear having an axis of rotation which defines with the axis of the gear of a received cartridge a plane rotated from a normal to the film plane by an angle substantially equal to said pressure angle, creating a line of force parallel to the film plane in response to driving engagement of said gears; and
    means for engaging a received cartridge at a place along a plane parallel to the film plane and in which the line of force lies when said gears are engaged to obviate the creation of a force moment responsive to such engagement.